June 1, 1965 T. E. FIDDLER 3,186,049
FASTENER
Filed Jan. 11, 1962
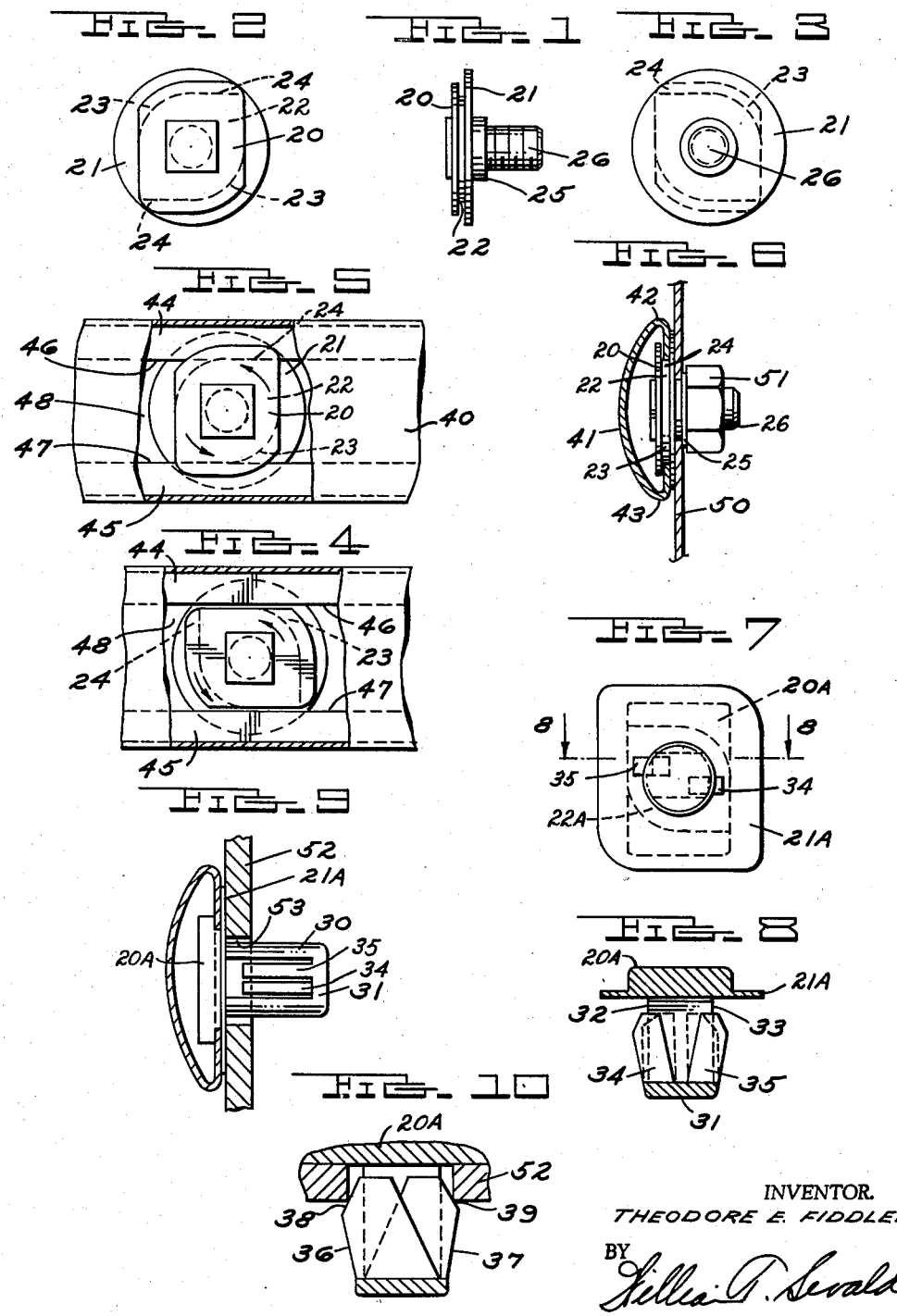
INVENTOR.
THEODORE E. FIDDLER
BY
ATTORNEY

United States Patent Office 3,186,049
Patented June 1, 1965

3,186,049
FASTENER
Theodore E. Fiddler, 1200 Cedar Ave.,
Birmingham, Mich.
Filed Jan. 11, 1962, Ser. No. 165,605
5 Claims. (Cl. 24—73)

This invention relates to fastening devices and more particularly pertains to a quick attaching device for mounting moldings on sheet material such as the sheet metal of automobiles, stoves, etc.

Fastening devices have been employed heretofore to facilitate the quick attachment of garnish molding to automobiles, stoves and the like, however, the several devices of the prior art have not proved entirely satisfactory inasmuch as they are complicated in design and construction, expensive to manufacture, difficult to use, and unsatisfactory in use.

With the foregoing in view, the primary object of the invention is to provide a fastening device for attaching garnish moldings on sheet metal and the like which is simple in design and construction, inexpensive to manufacture, easy to use, and highly satisfactory in use.

An object of the invention is to provide a non-rusting and sealing attaching device which eliminates deterioration of the fastening device and which also prevents deterioration of the sheet metal adjacent thereto during use.

An object of the invention is to provide a fastening device which engages the opposed flanges of a garnish molding to secure the garnish molding to the fastening device.

An object of the invention is to provide a head on the fastening device having a smaller width dimension for inserting the head between the flanges of the garnish molding and a larger length dimension for engaging the inner sides of the molding flanges upon turning the head after insertion through the channel between the molding flanges.

An object of the invention is to provide an engaging and sealing shoulder skirt on the fastening device which engages the outer sides of the opposed garnish molding flanges in opposition to the head with the shoulder skirt abutting not only the molding flanges but also the sheet metal to which the molding is attached, providing a protective washer like element between the molding and the sheet metal and also providing a seal surrounding the aperture in the sheet metal to prevent the permeation of elements such as water, salt, air and the like.

An object of the invention is to provide a neck portion in the fastening device between the head and shoulder skirt which has opposite arcuate corners providing clearance for turning the device between the edges of the garnish molding flanges and which has tangential or square corners for engaging and abutting the molding flange edges, preventing overturning and effecting lockup.

An object of the invention is to provide a spring torsion or pressure between the device head and and shoulder skirt when in the turned or engaged position on the molding so as to hold the fastening device in the locked mounted position relative to the molding.

An object of the invention is to provide attachment means on the fastening device for securing same and the molding attached thereto to the sheet metal object.

An object of the invention is to provide a bolt leading from the fastening device covered by a sleeve leading from the skirt shoulder so that upon the tightening of a nut thereon the sleeve is deformed and swaged against the aperture in the sheet metal, sealing same against the permeation of air moisture and also effecting a lock washer hold between the nut and bolt.

An object of the invention is to provide quick attaching means on the fastening device instead of a bolt and nut including a hollow stem equipped with camming flanges which are adapted to become spring loaded by the insertion of the device in an aperture in sheet metal and which has opposed camming edges urged by the spring load into engagement with the aperture walls to develop axially directed thrust force urging the device and molding into engagement with the outer side of the sheet metal and effecting attachment of the device to the sheet metal.

These and other objects of the invention will become apparent by reference to the following description of an attaching device embodying the invention taken in connection with the accompanying drawing in which:

FIG. 1 is a side elevational view of the side of the device seen in FIG. 2.

FIG. 2 is an end view of the device shown in FIG. 1.

FIG. 3 is an end view of the device seen in FIG. 1.

FIG. 4 is a view of the inventive device as seen in FIG. 2 in conjunction with a molding, shown partly in cross section, showing the device being inserted in the molding.

FIG. 5 is a view similar to FIG. 4 showing the device turned ninety degrees from the position seen in FIG. 4 so as to lock the head with the molding flanges.

FIG. 6 is a cross sectional view of the device seen in FIG. 5 additionally showing a sheet metal item and attaching nut.

FIG. 7 is a bottom plan view of a modified device as seen from the left of the device seen in FIG. 9.

FIG. 8 is a cross sectional view of the device seen in FIG. 7 taken on the line 8—8 thereof showing the springing action of the tangs in dotted lines.

FIG. 9 is a side elevational view of the device seen in FIGS. 7 and 8 showing additionally a molding and sheet metal part in cross section; and FIG. 10 is a partial cross sectional view similar to FIG. 8 showing the attaching tang abutment to the sheet metal.

Referring now to the drawing wherein like numerals refer to like and corresponding parts throughout the several views, the inventive device as disclosed therein to illustrate the invention is made of springable material and comprises a head 20 of relatively larger length dimension and smaller width dimension relative to one another for abutting one side of a molding flange, a skirt shoulder 21 spaced from the head 20 a distance preferably somewhat less than the material thickness of the molding flange, a neck 22 disposed between the head 20 and the skirt shoulder 21 interconnecting same, with the neck 22 having opposite arcuate corners 23 and opposite tangential square corners 24 respectively providing a turning radius between the flanges and an abutment against the flanges of a molding, a sleeve 25 below the skirt 21 and a bolt 26 or other fastening means connected to the head 20, skirt shoulder 21, and neck 22. When a molding flange is forced between the head 20 and the skirt shoulder 21, they springwise yield and receive and grip the flange.

The device of FIGS. 7 through 10 comprises a head 20A, skirt shoulder 21A, neck 22A, members 20A and 21A, corresponding with, but slightly different from, the head 20, skirt shoulder 21, and the neck 22A being like the neck 22 of the form of the invention shown in FIGS. 1–6, and a hollow stem 30 having an end portion 31 and open opposite sides 32 and 33, with tangs 34 and 35 attached to the end 31 and lying within the stem 30 and extending outwardly through the stem open sides 32 and 33. The tang extending side edges have paired opposed leading cam portions 36 and 37 and paired opposed oppositely angling following cam surfaces or portions 38 and 39, and the device of FIGS. 7 through 10 is preferably formed integrally by injection molding of synthetic resin plastic material inherently possessing spring qualities so that the tangs 34 and 35 are compressable and expandable relative to entering and passing partially through an aperture in sheet metal.

More particularly, the device of FIGS. 1 through 6 is associated with the molding 40 having a garnish face portion 41, reversely curved end portions 42 and 43 in cross section, and a back portion defined by two inwardly extending flange portions 44 and 45, with each flange portion having inner and outer sides and spaced opposed parallel edges 46 and 47 defining the molding channel 48 therebetween.

In operation, the user inserts the head 20, FIGS. 1-6, with its smaller width dimension passing through the channel 48 as seen in FIG. 4; and he then turns the device ninety degrees from the position seen in FIG. 4 to the position seen in FIG. 5. The arcuate corners 23 of the neck 22 permit the turning. The tangential or square corners 24 of the neck portion 22 contact the molding flange edges 46 and 47 and stop the turning.

Due to the fact that the molding flanges 44 and 45 are preferably slightly thicker than the distance between the head 20 and the skirt shoulder 21, turning the fastener from the position of FIG. 4 to that of FIG. 5 causes the head 20 and skirt shoulder 21 to become spring pressed against the opposite sides of the molding flanges 44 and 45, so that when the square corners 24 of the neck 22 abut the molding flanges opposed edges 46 and 47, the spring tension between the head 20 and the skirt shoulder 21 holds the device in the turned position of FIG. 5, thus securely mounting and locating the fastener in the molding 40, and also securely attaching the molding 40 on the fastening device, which is now ready for attachment to the sheet metal 50, which is equipped with a receiving aperture to receive the bolt 26. It will be understood that the various parts are not shown deformed under spring pressure for purposes of clarity in the drawing.

The molding is positioned adjacent the sheet metal 50, as seen in FIG. 6, with the bolt through the receiving aperture, and upon turning the nut 51 to the secured position as shown the molding and fastener are secured to the sheet metal 50 with the sleeve 25 swaged and compressed into the aperture in the molding 50, thereby sealing same; and it is to be further noted that the skirt flange 21 provides a shield between the molding 40 and sheet metal 50, and it is to be further noted that the tangential or square corners 24 of the neck engage the edges 46 and 47 of the molding flanges; thereby preventing rotation of the bolt 26 as the nut 51 is turned and secured thereon.

Referring now to the device of FIGS. 7 through 10, it will be understood that the fastening device is inserted and secured to the molding as previously described in conjunction with FIGS. 4 and 5; however, the attaching means to the sheet metal is modified and comprises the hollow stem 30 and attaching tangs 34 and 35 which are made of plastic or springable material.

In mounting this device, the stem end 31 is first inserted through the aperture 53 in the sheet metal 52, whereupon the leading camming surfaces 36 and 37 of the tangs 34 and 35 are engaged by the side walls of the sheet metal aperture 53, and the tangs 34 and 35 are compressed to the dotted line position seen in FIG. 8. Further axial movement through the sheet metal opening 53 allows the following camming edges 38 and 39 of the tangs 34 and 35 to engage the sheet metal member 52 at the aperture 53, and, because of their spring loaded condition, they press against the sheet metal 52 and tend to pull the fastening device axially farther through the hole, thereby camming the skirt shoulder 21 against the sheet metal 52 in sealing relationship relative to the aperture 53 at its outer side.

It is therefore obvious that the device of FIGS. 7-10 is quickly and easily mounted in the molding as previously described, and also quickly and easily mounted in the sheet metal aperture by merely pushing the stem end 31 through the aperture, whereupon the tangs automatically compress and expand to secure the device and molding attached thereto to the sheet metal member; and it is obvious that a blind attachment is thereby completely facilitated.

The fastening devices are preferably injection molded of synthetic resin plastic material so that they form natural sealing and protective elements and also so that the sleeve 25 of the device of FIGS. 1-6 and the tangs 34 and 35 of the device of FIGS. 7-10 are pliable and springable to perform their intended functions.

The inventive fastening devices with these features constitute a compact, durable, neat appearing, easily operated and protective sealing and attaching device which is easily and quickly mounted in the molding and then easily and quickly mounted to the sheet metal member in a molding supporting and attaching condition.

Although but two embodiments of the invention have been shown and described in detail, it is obvious that many changes may be made in the size, shape, detail, and arrangement of the various elements of the invention within the scope of the appended claims.

I claim:
1. A fastening device particularly suitable for mounting moldings on sheet metal such as cars, stoves, and the like wherein the molding has a garnish face portion, reversely curved end portions in cross section, and a back portion defined by two inwardly extending flange portions leading from the reversely curved end portions, with the flange portions each having inner and outer sides and spaced opposed parallel edges defining a channel therebetween;
　　said device comprising a head of larger length and smaller width dimensions,
　　with the smaller width dimension being less in extent than the channel width of the molding in which the device is associated, allowing insertion of said head width dimension between the molding flange edges, and
　　with the larger length dimension being greater than the extent of the channel width between the flange edges of the molding so that upon turning said head ninety degrees after insertion said head larger length dimension overlies the back sides of the molding flanges, preventing outward movement of said head,
　　a skirt shoulder spaced from said head a sufficient distance to enable said head and skirt shoulder to receive the material thickness of the molding flanges, said skirt shoulder engaging the molding flanges outer sides to prevent inward movement of said head,
　　and a neck portion on said head disposed between said head and said skirt shoulder interconnecting said head and said skirt shoulder and
　　having opposite arcuate corners providing clearance for turning said neck ninety degrees relative to the molding flange edges and
　　opposite square tangential corners for abutting the molding flange edges to prevent overturning and to effect lockup abutment,
　　and sheet metal attachment means on said head for securing said device and a molding attached thereto on sheet metal.

2. In a device as set forth in claim 1, said attachment means being a bolt,
　　a sleeve extending from said skirt shoulder and overlying said bolt and made of deformable material,
　　and a nut threaded on said bolt, engaging said sleeve, and deforming and swaging said sleeve, to fill the bolt receiving aperture in the sheet metal, to close same against the penetration of elements such as water, salt, air, etc.

3. In a device as set forth in claim 1, said sheet metal attachment means being made of springable material and comprising
　　a hollow stem extending from said skirt shoulder and having an opening extending therethrough between two opposite sides thereof and closed at the end portion thereof, and paired tangs supported on said end portion, said end portion and said tangs being resilient, and said tangs having the greater portions thereof located within said stem opening and having their sides substantially radial with respect to the stem axis, and each of a pair of said tangs extending outwardly from said opening and oppositely to the other of said pair of tangs, said tangs having tangs extending side edges, each of said side edges having paired opposed leading and following, oppositely angling, camming surfaces meeting at a radially high point midway in the tang side edge;

said stem closed end being first insertable in a sheet metal opening, with said tangs leading, camming side edges on the opposite sides of said stem engaging the side walls of the sheet metal opening, compressing same, so as to spring load said tangs, said spring load on said tangs springing said stem end portion in opposite directions; whereupon, said tangs passing their radially high points, the spring loaded tangs following cam surfaces press outwardly against the sheet material opening side walls, camming said stem further through in an axial direction, so as to pull said skirt shoulder against the opposite side of the sheet metal in sealing relationship thereto, and to attach said device to the sheet metal.

4. A device having sheet metal attachment means made of springable material comprising, a head, a hollow stem extending from said head and having an opening extending therethrough between two opposite sides thereof and closed at the end portion thereof, and paired tangs supported on said end portions, said end portion and said tangs being resilient, and said tangs having the greater portions thereof located within said stem opening and having their sides substantially radial with respect to the stem axis, and each of a pair of said tangs extending outwardly from said opening and oppositely to the other of said pair of tangs, said tangs having extending side edges, each of said side edges having paired opposed leading and following oppositely angling camming surfaces meeting at a radial high point midway in the tang side edges thereof;

said stem closed end portion being first insertable in a sheet metal opening with said tangs leading camming side edges on the opposite sides of said stems engaging the side walls of the sheet metal opening and compressing same, so as to spring load said tangs, said spring load on said tangs springing said stem end portion in opposite directions, whereupon, said radially high points of said tangs passing the side walls of said opening, the spring loaded tangs following cam surfaces press outwardly against the sheet material opening side walls, camming said stem further through in an axial direction, so as to pull said head against the opposite side of the sheet metal in abutting relationship thereto, and to attach said device to the sheet metal.

5. An insulator-fastener particularly suitable for mounting a metal molding on a metal panel such as on cars, stoves, and the like wherein the molding has a garnish face portion, reversely curved end portions in cross-section, and a back portion defined by two inwardly extending flange portions each having inner and outer sides and spaced opposed parallel edges defining a channel therebetween; said insulator-fastener being capable of providing metal-from-metal separation between said fastener and the molding and panel and between the molding and the panel to reduce electrolysis.

said device comprising an insulator head of suitable material of larger length and smaller width dimensions, with the smaller width dimension being less in extent than the channel width of the molding in which the device is associated, allowing insertion of said head width dimension through the molding channel between the molding flange edges, and with the larger length dimension being greater than the extent of the channel width between the flange edges of the molding so that, upon turning said head, said head larger length dimension lies behind the back sides of the molding flanges preventing outward movement of said head, said head providing metal-from-metal separated engagement between itself and the molding;

an insulator skirt of suitable material connected to and spaced from said head a distance less than the thickness of the molding flange to force said head and skirt apart in receiving the material thickness of the molding flanges therebetween, said skirt overlying the molding flanges outer sides to provide insulated metal-from-metal spacing between the molding and the panel, at least one of said head and said skirt being resiliently springwise deformable so that, upon the flange of a molding being forced between said head and said skirt, the molding flange is resiliently spring-wise held therebetween, holding said head in the turned engaged position behind the flanges of the molding;

and attachment means on said head for securing said device and a molding attached thereto on a panel.

References Cited by the Examiner
UNITED STATES PATENTS

| | | | |
|---|---|---|---|
| 1,985,333 | 12/34 | Wiley | 85—9 X |
| 2,077,120 | 4/37 | Lombard | 85—5 |
| 2,788,100 | 4/57 | Landell | 24—7 X |
| 2,958,108 | 11/60 | Scott | 24—73 |
| 3,114,949 | 12/63 | Meyer | 24—73 |
| 3,127,965 | 4/64 | Weisenberger | 24—73 |
| 3,137,048 | 6/64 | Bedford | 24—73 |
| 3,141,209 | 7/64 | Van Buren | 24—73 |

DONLEY J. STOCKING, *Primary Examiner.*

ABRAHAM G. STONE, M. HENSON WOOD, JR.,
*Examiners.*